(12) United States Patent
Pyhälammi et al.

(10) Patent No.: US 6,996,393 B2
(45) Date of Patent: Feb. 7, 2006

(54) MOBILE CONTENT DELIVERY SYSTEM

(75) Inventors: Seppo Pyhälammi, Helsinki (FI); Kaj Häggman, Espoo (FI); Ilkka Aartolahti, Espoo (FI); Markku Rauhamaa, Helsinki (FI)

(73) Assignee: Nokia Corporation, Espoo (FI)

( * ) Notice: Subject to any disclaimer, the term of this patent is extended or adjusted under 35 U.S.C. 154(b) by 605 days.

(21) Appl. No.: 09/944,443

(22) Filed: Aug. 31, 2001

(65) Prior Publication Data

US 2003/0045273 A1 Mar. 6, 2003

(51) Int. Cl.
*H04Q 7/20* (2006.01)
*H04Q 7/38* (2006.01)

(52) U.S. Cl. ............................. 455/412.1; 455/412.2; 455/456.1; 455/456.5; 455/466; 455/422.1; 455/414.1; 455/414.2; 705/7; 705/8; 705/9; 705/14; 375/220

(58) Field of Classification Search ............... 455/403, 455/414.1, 414.2, 517, 414.3, 422.1, 456.1–456.6, 455/457, 412.1, 412.2, 550.1, 406, 407, 408, 455/405, 453, 423, 424, 425, 67.11, 466, 455/445, 433, 432.1, 426.1, 426.2; 705/7, 705/8, 9, 14; 375/220
See application file for complete search history.

(56) References Cited

U.S. PATENT DOCUMENTS

| | | | |
|---|---|---|---|
| 5,216,515 A | 6/1993 | Steele et al. | |
| 5,463,620 A | 10/1995 | Sriram | |
| 5,491,820 A | 2/1996 | Belove et al. | |
| 5,635,918 A | 6/1997 | Tett | |
| 5,708,960 A | 1/1998 | Kamisaka et al. | |
| 5,740,549 A | 4/1998 | Reilly et al. | |
| 5,926,624 A | 7/1999 | Katz et al. | |
| 5,928,331 A | 7/1999 | Bushmitch | |
| 6,052,730 A | 4/2000 | Felciano et al. | |
| 6,055,570 A | 4/2000 | Nielsen | |
| 6,061,718 A | 5/2000 | Nelson | |
| 6,081,518 A | 6/2000 | Bowman-Amuah | |
| 6,147,975 A | 11/2000 | Bowman-Amuah | |
| 6,199,096 B1 | 3/2001 | Mirashrafi et al. | |
| 6,211,869 B1 | 4/2001 | Loveman et al. | |
| 6,226,523 B1 | 5/2001 | Karlsson et al. | |

(Continued)

FOREIGN PATENT DOCUMENTS

WO   WO 00/56088   9/2000

(Continued)

OTHER PUBLICATIONS

PCT International Search Report, International Application No. PCT/IB02/03353, Date of Completion of Search—Feb. 21, 2003, Sheets 1, Continuation of First Sheet (2) and 2.

(Continued)

*Primary Examiner*—Keith Ferguson
(74) *Attorney, Agent, or Firm*—Morgan & Finnegan, L.L.P.

(57) ABSTRACT

A mobile content delivery system that optimizes the delivery of especially bandwidth-consuming content (or the flow of any peak-hour data traffic) in a way that best utilizes the free capacity in the radio network, thus enabling considerably more efficient usage of the radio capacity. It also allows new services and pricing structures to be used in the cellular network, that otherwise would not be possible. The class of delivery of message content can be selected by the user on a transaction basis, or subscription-based and pre-defined in a user profile. By choosing a scheduled delivery the user can receive the content at a fraction of the price compared to instant delivery, since the content is sent at a time when the network is least utilized.

32 Claims, 7 Drawing Sheets

U.S. PATENT DOCUMENTS

| | | |
|---|---|---|
| 6,236,991 B1 | 5/2001 | Frauenhofer et al. |
| 6,366,947 B1 | 4/2002 | Kavner |
| 6,381,637 B1 | 4/2002 | Kamada |
| 6,421,717 B1 | 7/2002 | Kloba et al. |
| 6,449,488 B1 * | 9/2002 | Cheng et al. ............... 455/466 |
| 6,493,758 B1 | 12/2002 | McLain |
| 6,505,242 B2 | 1/2003 | Holland et al. |
| 6,591,288 B1 | 7/2003 | Edwards et al. |
| 2001/0003828 A1 | 6/2001 | Peterson et al. |
| 2001/0007105 A1 | 7/2001 | Brotz et al. |
| 2001/0036224 A1 * | 11/2001 | Demello et al. ............ 375/220 |
| 2002/0010758 A1 | 1/2002 | Chan |
| 2002/0107985 A1 * | 8/2002 | Hwang et al. .............. 709/246 |
| 2002/0111855 A1 * | 8/2002 | Hammerstad ................ 705/14 |
| 2002/0151294 A1 * | 10/2002 | Kirby et al. ................ 455/406 |
| 2003/0016656 A1 * | 1/2003 | Schwartz ................... 370/352 |
| 2003/0032409 A1 * | 2/2003 | Hutcheson et al. ......... 455/414 |
| 2004/0253945 A1 * | 12/2004 | Janik .......................... 455/419 |

FOREIGN PATENT DOCUMENTS

| | | |
|---|---|---|
| WO | WO 00/57610 | 9/2000 |
| WO | WO 00/57610 A3 | 9/2000 |
| WO | WO 00/64203 | 10/2000 |
| WO | WO 01/28171 A1 | 4/2001 |
| WO | WO 01/33781 A1 | 5/2001 |
| WO | WO 01/33782 A1 | 5/2001 |

OTHER PUBLICATIONS

Patel, A. and Gaffney, K., "A technique for multi-network access to multimedia messages", Computer Communications 20 (1997), pp. 321-337.

* cited by examiner

MOBILE CONTENT DELIVERY SYSTEM

FIELD OF INVENTION

This invention relates to systems and methods for delivering mobile content over a wireless communications network.

BACKGROUND INFORMATION

Traditionally, the majority of data messages have been sent across radio networks in real-time when the user requests them. This common practice of "Deliver NOW" is utilized extensively in the growing area of text-based message or voice services of cellular networks. The delivery of data in real-time ignores the fact that wireless network data traffic is unevenly distributed. The maximum network capacity is dimensioned to match the network load peaks, thus leaving a lot of unused capacity in the network. Typically, in a twenty-four hour day cycle (except for a few traffic peaks during office hours), more than half of the network capacity is unused.

Typical message delivery systems on wireless networks have sustained themselves due to strict adherence to a small file size requirement. The cost of a wireless network delivering larger file size content such as a video clip or an image file on demand would be prohibitively expensive, as well as time-consuming, to the end-user. Many current wireless network delivery systems have addressed the problem by adding additional network base stations and fine tuning coding techniques. These methods only lead to additional capacity without reducing the cost to send the actual data over the wireless network. If the sending device tries to send a message and the recipient is not available (e.g. terminal is turned off) the service center continues to send messages so long it can reach the recipient device (the amount of time the service center attempts to send the message can be limited to a pre-determined time window).

Therefore, there exists a need for a system and method whereby a user could specify, using his or her wireless terminal device, whether a message is to be delivered in real-time which will prevent the system from managing present network load conditions while the message is being delivered, or to be time delayed to suit the existing demands on the wireless network.

SUMMARY OF THE INVENTION

In a preferred embodiment of the invention there is provided a system and method whereby a user who has requested content selects a class of delivery for the content from his or her wireless terminal device, such as a cellular phone. The class of delivery of message content can be selected by the user on a transaction basis, or subscription-based and pre-defined in a user profile. The content is delivered as a message, which is preferably comprised of three parts: a message header (e.g. the source and destination address, the identity and type of message, etc.); a message body, which is essentially the content; and a delivery class field, identifying the class the user selected to deliver the message content. The user can preferably select from at least two delivery classes: "deliver NOW" in real-time; or a specified "time delay delivery". A "time delay delivery" is referring to a pre-determined time window to deliver content, and can be further divided into classes based on the defined delay. The "time delay delivery" class allows the wireless network to send the content at a time when the network is least utilized.

In the preferred embodiment, a user's content request is sent to a Content/Service Provider which creates a content delivery message with the requested information including the content and delivery class. The Content/Service Provider relays the message to a Messaging Transport System (MTS) in charge of delivering the message to the user, or directly to the Mobile Content Delivery (MCD) system. The selected MCD System acts as the scheduled delivery engine that calculates the pre-determined time window the content delivery message is to be sent by notifying the Messaging Transport System. The time window of delivery is calculated preferably taking into account such information as the delivery class, the wireless device location in the radio network, the wireless network usage and relative capacity (actual and historical), and the size of the content that can be delivered in the pre-determined time window. A short period before the content delivery message is to be delivered, the wireless device location is determined, the actual network load condition at the wireless device is determined and compared to the historical information (the "load curve"). If conditions are right, the message is sent to the end-user's wireless device via the cellular network.

The present invention will introduce a mechanism that allows operators to provide new data services (especially high-volume content) cheaper without sacrificing their high-margin business, thus enabling more services, as well as attracting more users. The present invention further allows data traffic on a wireless network to be more evenly distributed over a twenty-four hour day cycle, thus actually increasing the total network throughput, without having to upgrade the wireless network components. The present invention will provide users with new services at a reduced price, directly to their wireless device.

Other and further aspects of the present invention will become apparent during the course of the following description and by reference to the attached drawings.

DETAILED DESCRIPTION OF THE INVENTION

Figure 1:
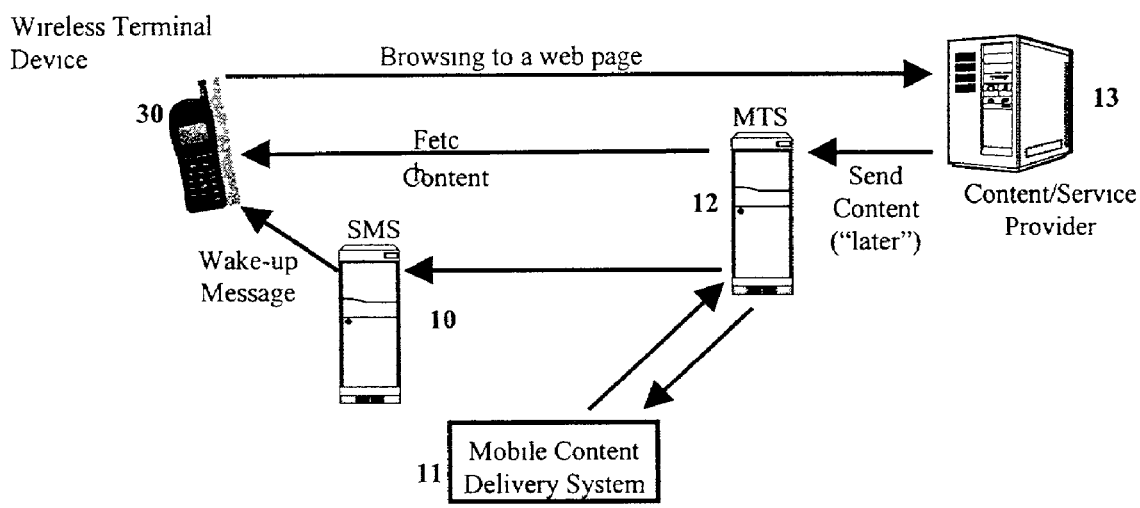
FIG. 1 is a Mobile Content Delivery Wireless Network diagram illustrating one embodiment of the present invention.

FIG. 1 shows one embodiment of a wireless network of the present invention whereby an individual may use a hand-held wireless terminal 30 (e.g., a cellular phone) enabled with a browser to view, select, and specify a delivery class for a web-based content from a Content/Service Provider 13 via a data network such as the internet. In another embodiment the delivery class can automatically be selected for the user depending on the destination address, the content type, the content provider, and the sender agreement with the operator accompanied by billing information collected by the MCD system for each user. In this embodiment, the Content/Service Provider 13 creates a message with both user selected content and delivery class, which it sends to a Messaging Transport System (MTS) 12, which analyzes wireless terminal capabilities and status, as well as is capable of delivering content message to the wireless terminal device 30. The MTS 12 acts as a gatekeeper of all content that is provided over the wireless network and also could possibly select the delivery class depending on the content or other network parameters in one particular embodiment.

The MTS 12 transmits the message to a Mobile Content Delivery (MCD) system 11 describing an embodiment of the present invention. The MCD system 11 schedules a delivery time window of the content by analyzing the delivery class, wireless device location, existing network activity loading and the content size while taking into account the agreed upon user maximum delivery time. The MCD system 11 is provided with delivery time window flexibility provided the end-user did not select "Deliver NOW" as the delivery class. The MCD system 11 also preferably tracks previous message deliveries in order to properly predict and schedule future message deliveries at a more cost-effective network activity time window without surpassing the agreed upon user maximum delivery time. The Mobile Content Delivery system 11 will be discussed in detail hereinafter in connection with FIG. 3.

Moments before the predetermined time window of delivery, MCD system 11 returns the message content to the MTS 12. The MTS 12 relays a "Wake-Up" message to the Short Message System(SMS) 10, or an equivalent service center, which in-turn sends a "WakeUp" message to the wireless terminal device 30. The Short Message System 10 generates a short message and attaches a Quality of Service (QoS) parameter which adjusts the speed of delivery of content through the network. The SMS 10, like the MTS 12, is a well-known component of the wireless network. Once the scheduled delivery time window has arrived, the content is delivered to the end-user at the wireless terminal device 30. In traditional cellular networks using less advanced terminal devices the content is fetched by the terminal device 30 using information in the "Wake-Up" message, in advanced networks the content is pushed to the wireless terminal device from the network, in this embodiment by the MTS 12. FIG. 1 is a simplified illustration of the mobile content delivery wireless network. Variants of FIG. 1 can include transferring message content between multiple MCD systems 11 as well as selecting delivery servers other than MTS 12 to deliver content to the end-user. These variations can occur while being transparent to both the end-user user at wireless terminal device 30 and the Content Service Provider 13. A detailed description of these variations are described in FIGS. 3, 4, and 5.

Figure 2:
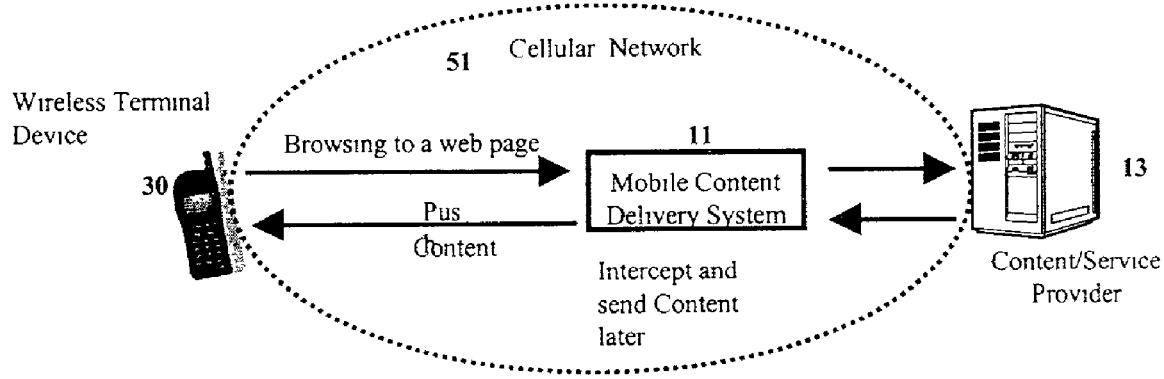
FIG. 2 is a Mobile Content Delivery Wireless Network diagram illustrating another embodiment of the present invention.

FIG. 2 shows another embodiment of a wireless network of the present invention whereby an individual having an agreement with an operator allowing scheduled delivery may use a hand-held wireless terminal 30 (e.g., a cellular phone) enabled with a browser to view and select web-based content from a Content/Service Provider 13 via a data network such as the internet. The MCD system 11 is provided with the capability of listening to all traffic, intercepting and re-directing it, as well as being able to insert new data or modify existing data streams, while being able to coordinate downloading content from the content/service provider to the network. When the user with a hand-held wireless terminal 30 selects some large content from the Content/Service Provider 13, the MCD system 11 intercepts that traffic based on what has been specified for the user in the operator profile. The Content/Service Provider 13 service continues sending the large content, but it is stored in the MCD system 11 instead of being sent to the wireless terminal device 30. At the same time, the MCD system 11 informs (e.g. with a specific web page) the wireless terminal device 30 that the delivery is being scheduled, disconnects the terminal session and simultaneously downloads the most recent content from the Content/Service Provider 13 to a Cellular Network 51. The MCD system 11 schedules a delivery time window of the content using methods described earlier, and once the scheduled delivery time window has arrived, the content is delivered to the end-user at the wireless terminal device 30 using an existing push mechanism in the cellular network. In another possible variation the MCD system 11 could deliver just the content link address to wireless terminal 30, allowing for the actual content to be downloaded at a later time to ensure the user receives the most current available content.

Figure 3:
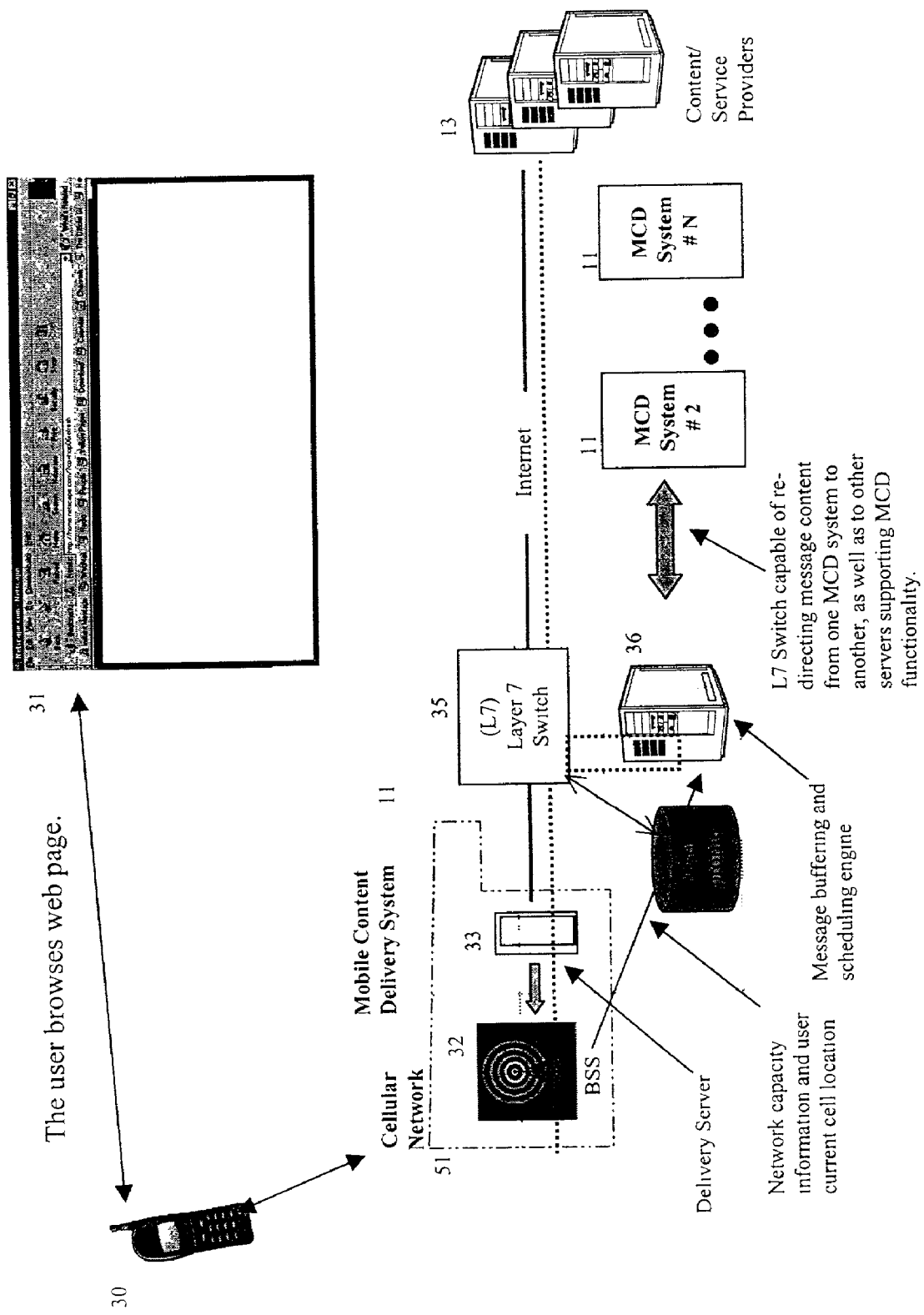
FIG. 3 is a functional diagram illustrating the Mobile Content Delivery system according to an exemplary embodiment of the present invention.

FIG. 3 shows one implementation of the Mobile Content Delivery System 11 of the present invention. Variants of FIG. 3 can include different delay mechanisms (selected by the user, specified by the Content Provider, or subscription-based), as well as various transport mechanisms (through the MCD system, through another system in the network, using pull or push depending on the wireless device capabilities). These variations can occur while being transparent to the end-user user at wireless terminal device 30. The components in this implementation shown in FIG. 3 are: the MCD systems 11; a Cellular Network 51; which could be comprised of a Delivery Server 33, a Base Station System 32; and a Message Buffering and Scheduling Engine 36. On a larger scale, FIG. 3 can be part of a wide area network comprising many users and multiple base stations to cover a large user region.

The end-user locates content he wishes to receive via a browsing screen 31 on his wireless terminal device 30. On the screen, the end-user selects the content and the desired class of delivery. In this example implementation the user selects a delivery class from three delivery classes: "Deliver Now", for time critical data; "Specified Time Delay" delivery, for less critical data; or, "Overnight Delivery", which is the least expensive option. Alternatively, his delivery class may also be selected automatically as described earlier. (Note: Three classes of time delivery are shown for illustrative purposes only, the MCD system allows for numerous delivery classes and corresponding prices, set by the operator.) The user browsing session goes over the wireless network via Base Station System 32, which in turn relays it to the Content/Service Provider 13 through a Layer 7 Switch 35 connection to a data network such as the Internet, Extranet, Intranet, LAN, or alternate networks. The Layer 7 switch 35 monitors messages for preset parameters to determine scheduled delivery.

The Content/Service Provider 13 creates a message based on receipt from the wireless terminal of addressing information such as: IP address or mobile phone number, default message server address, content request ID, and the class of delivery, which it then routes to the Message Buffering and Scheduling Engine 36 of the selected MCD system 11 via the Layer 7 switch 35. Depending on network data activity, the Layer 7 switch 35 may re-direct the message content to another MCD system 11 with a lighter network server data activity load. Alternatively, if the chosen transport mechanism (in this example implemenation the MTS 12) supports usage of delivery class parameters, the Layer 7 switch 35 may re-direct the message content to a different MTS 12, which communicates with the MCD system 11.

The Message Buffering and Scheduling Engine 36 fetches wireless network activity updates and current cell user location from Cellular Network 51 which it uses to schedule a time window to send the message to the wireless terminal device 30 based on the specified class of delivery, the user handset location, network capacity usage, and file size of the content. Once the pre-determined delivery time window has arrived, the selected Message Buffering and Scheduling Engine 36 sends the re-directed message content to MTS 12 (reference FIG. 1). The MTS notifies the SMS 10 (reference FIG. 1) to send a Wake-Up message to the wireless terminal device 30 via the Cellular Network 51. The MTS 12 acts a Delivery Server 33 and delivers the requested content to the wireless terminal device 30 via the Cellular Network 51. In one embodiment, the MCD 11 can be the Delivery Server 33, in another some other transport mechanism is used as Delivery Server by the MCD. The present invention allows the selection and re-direction of message content amongst various MCD systems 11 to be transparent to both the Content Service Provider 13 and the wireless terminal device 30 allowing for just one destination address, as well as the option for wireless terminal device 30 having the capability of being the source of the content to be sent to the network with the permission of the MCD system. In a preferred embodiment the user receives message content to the terminal device 30 at a reduceD price, without having to wait for it to arrive over an active wireless terminal session, making the experience a pleasant one.

Figure 4:
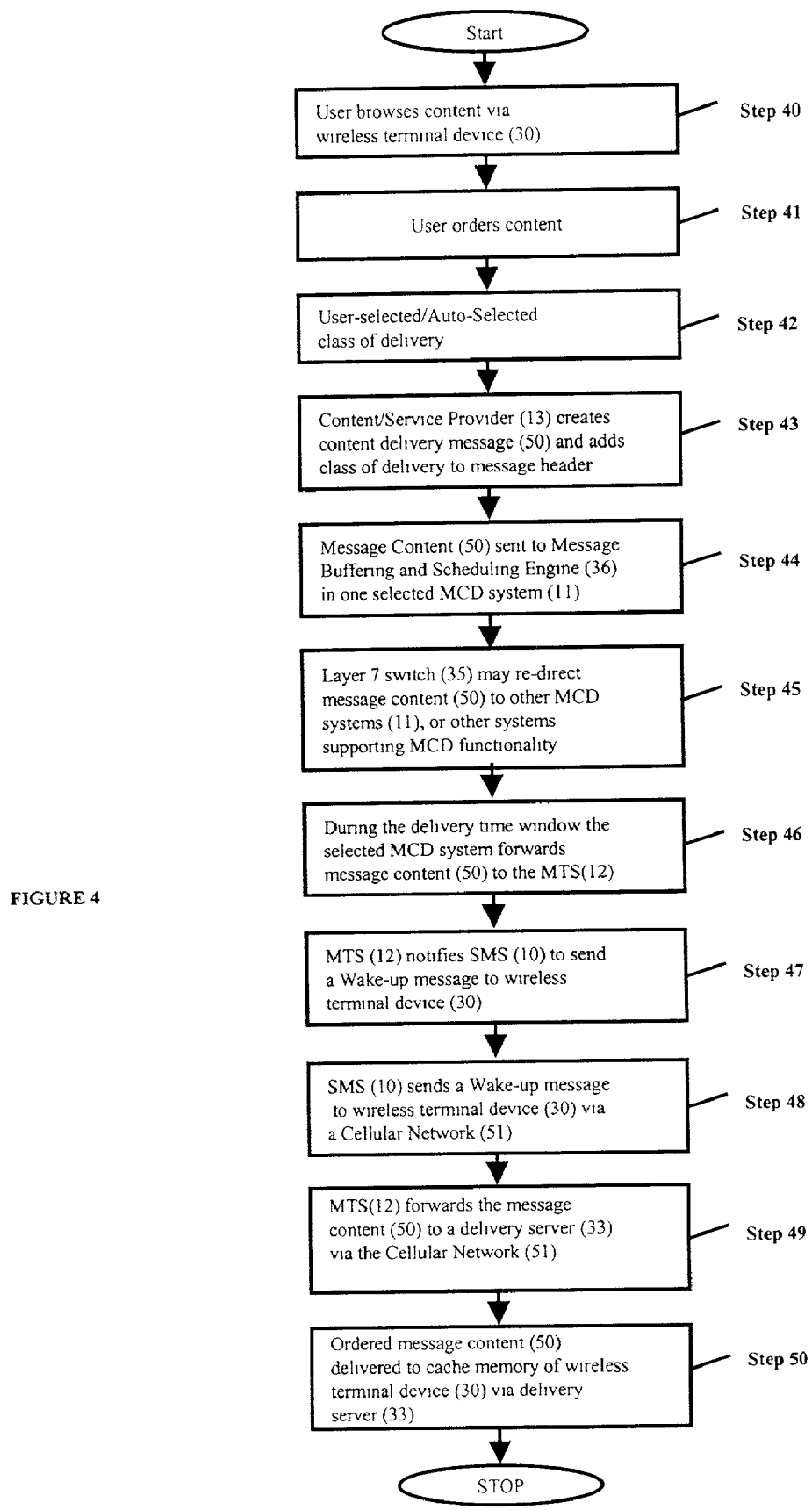
FIG. 4 illustrates a flow diagram of the Mobile Content Delivery process according to the exemplary embodiment of the present invention.

FIG. 4 shows the functional logic flow of mobile content delivery in accordance with one embodiment of the present invention. In step 40, the user browses content via the wireless terminal device 30. In steps 41 and 42, the user orders content and can preferably choose from User-selected and Auto-Selected classes of delivery. User-selected, allows the user to select the class of delivery, "Deliver Now", or time delayed delivery as described earlier. Auto-Selected, is where a predetermined delivery class type is already established due to an existing agreement between the operator or Content/Service Provider 13 and the user in order to avoid high delivery cost, for instance; or, where the delivery class can possibly be linked to the content type automatically. (Note-The network operator and the content service provider may or may not be the same entity.) In step 43, a Content/Service Provider 13 creates a content delivery message which includes the delivery class information in the message header. In step 44, Content Provider 13 sends the message to the Message Buffering and Scheduling Engine 36 of the selected MCD system 11 over Layer 7 switch 35. The Layer 7 switch 35, monitors network data traffic and may re-direct message content 50 to other MCD systems 11 under lighter network loads, or to other systems supporting MCD functionality, in step 45. In step 46, the Message Buffering and Scheduling Engine 36 schedules the content delivery time window for the user and forwards the message content 50 to the Messaging Transport System (MTS) 12. As the delivery time window approaches, the MTS 12 notifies the Short Message System (SMS) 10 to send a "Wake-up" message to the wireless terminal device 30 in step 47. In Step 48, the SMS 10 sends the "Wake-up" message to wireless terminal device 30 via the Cellular Network 51. In Step 49, the MTS 12 forwards the message content 50 to the Delivery Server 33 via the Cellular Network 51. In Step 50, the ordered message content 50 is delivered to the wireless terminal device 30 via Delivery Server 33.

Figure 5:
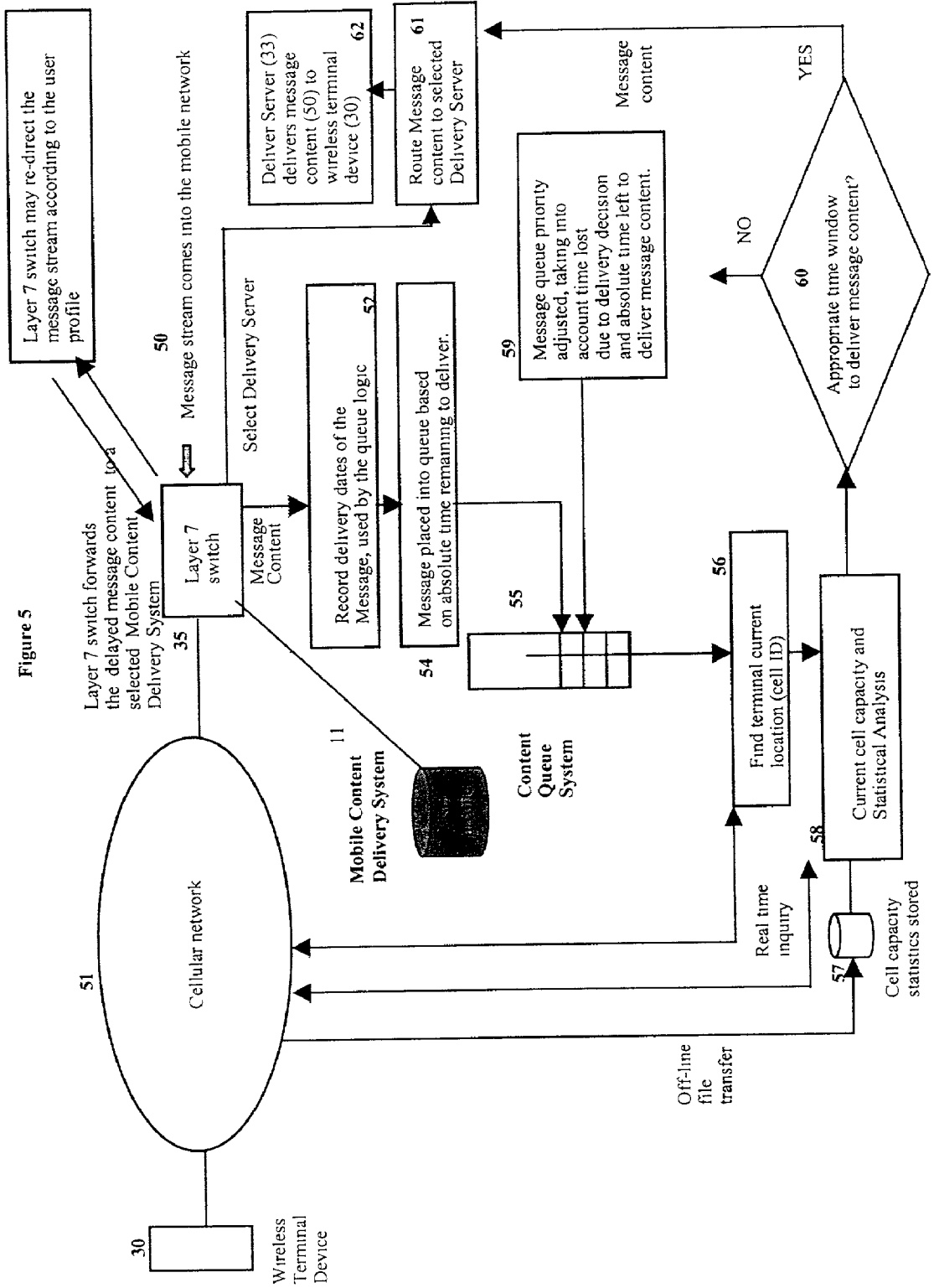
FIG. 5 is a diagram of the Message Buffering and Scheduling Engine according to a preferred embodiment of the present invention.

FIG. 5 shows details of a preferred embodiment of the Message Buffering and Scheduling Engine 36 within the MCD system 11. It demonstrates the method by which the Mobile Content Delivery System 11 schedules the delivery of content based on a number of wireless network parameters. In particular, the details of the interaction between the Message Buffering and Scheduling Engine 36 and other wireless network elements are shown. The L7 switch 35 receives the content delivery message 50 coming into the mobile network, consisting of necessary parameters to trigger the scheduled delivery, such as the address of the service where the content was viewed and ordered, the destination address of the wireless terminal device 30 (or possibly a mobile phone number) to which the content is to be delivered, the delivery class, and the body of the message, which contains the content to be delivered. The Layer 7 switch 35 monitors messages and other network traffic and forwards those message content requests that have a delayed class of delivery. Once an MCD system 11 is selected, the Layer 7 switch 35 forwards the message content the message to the Message Buffering and Scheduling Engine 36 of the selected Mobile Content Delivery System 11. The Layer 7 switch 35 may re-direct the message content to another MCD (compatible) system 11 as mentioned earlier. Based on the delivery class, the Message Buffering and Scheduling Engine 36 records the earliest allowed time for delivery, as well as an expiration date in Block 52, that is used by the queue logic for the specific message. Block 54 determines the priority of the message in a Content Queue 55 based on the delivery time window remaining.

In parallel with the content queuing activity, the Message Buffering and Scheduling Engine 36 queries Cellular Network 51 in real time for the cell ID corresponding to the cell in which the wireless terminal device 30 is currently located at Block 56. Cell activity records are maintained in server database 57. The Message Buffering and Scheduling Engine 36 uses these records as well as on-line queries in determining the cell's capacity and usage in block 58. Offline file transfer regarding cell activity records can be gathered to server database 57 from the cellular network 51. On-line queries regarding cell activity can be done from the cellular network 51 at block 58. At decision block 60, the Message Buffering and Scheduling Engine 36 assesses past and present cell capacity, current user location, content file size, and time remaining to deliver content. If the decision block 60 determines that this is not an appropriate time window to deliver the message content, the queue priority of the message is adjusted based on the absolute time remaining to deliver the message content while taking into account the time lapsed to reach the "NO SEND" decision. However, if decision block 60 determines that this an appropriate time window to deliver message content based on the aforementioned factors, the Layer 7 switch 35 will designate a Delivery Server 33 selecting from a group of servers available to deliver the message content at Block 61. At Block 62, Deliver Server 33 delivers message content 50 to the wireless terminal device 30. Many plausible variations of FIG. 5 exist based on chosen service and delivery mechanism, all parameterized in the MCD and transparent to wireless terminal device 30 and the Content Service Provider 13.

Figure 6:
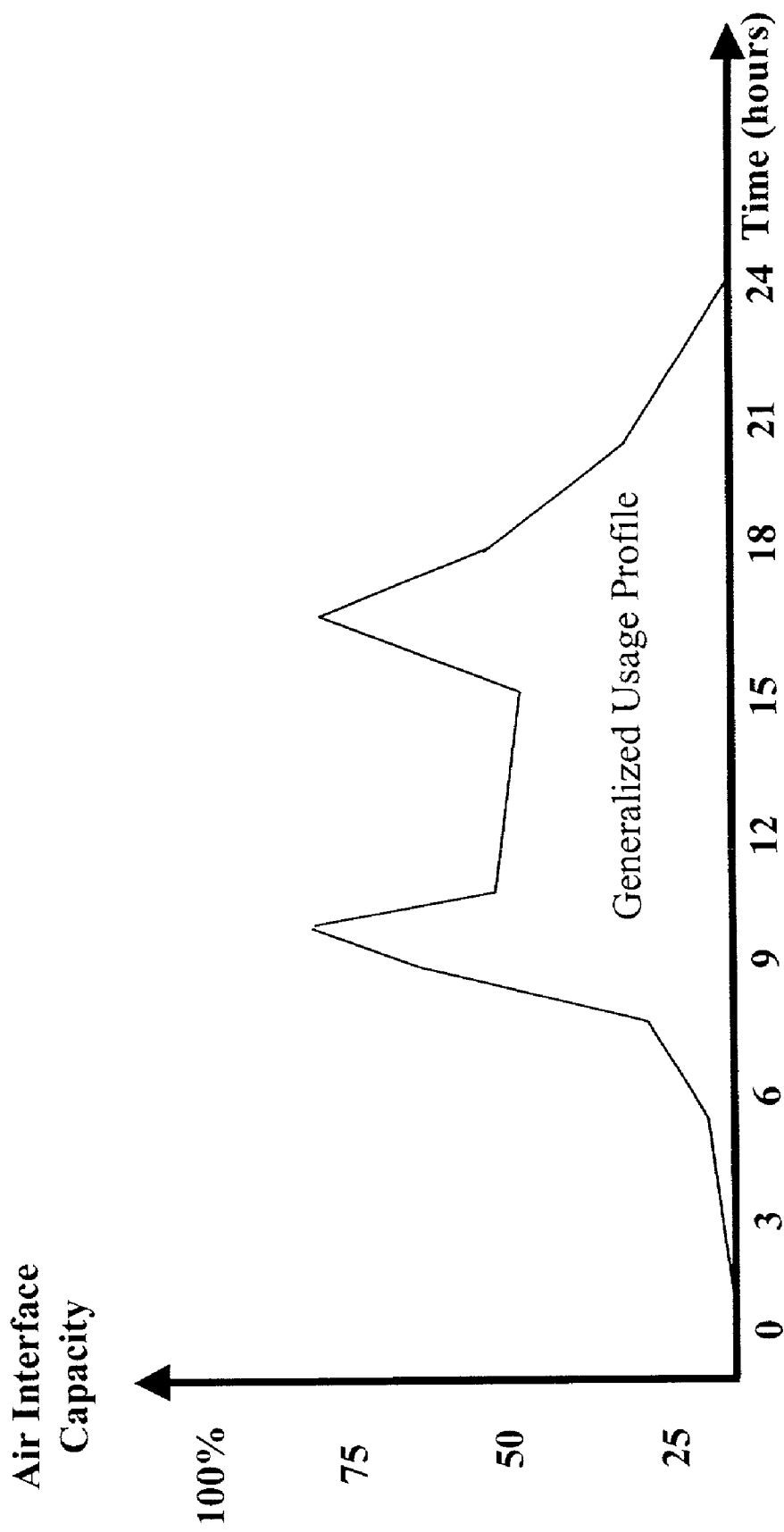
FIG. 6 is a graph illustrating a generalized wireless network air interface usage profile over a twenty-four hour period.

FIG. 6 shows a generalized usage profile for a wireless network air interface over a 24 hour day cycle within one territory. Actual usage profiles can vary greatly from this illustration. The embodiment of the present invention delivers content via the wireless network taking into account such usage profiles. Reference to the FIG. 6 shows that in the morning between the hours of approximately 7 AM and 10 AM and the afternoon between the hours of approximately 3 PM and 6 PM the wireless network experiences the heaviest usage traffic. It would thus be most costly to deliver content during these time periods, and should be avoided unless the message is time critical. Between the approximate hours of 10 AM and 3 PM the data traffic falls off to approximately 50–55% capacity, down from a peak of approximately 80% capacity. Finally, the ideal time to deliver message content is either during the early morning hours between midnight and 6 AM or the late evening hours between 9 PM and midnight. During these time periods will likely present the most cost-effective time windows for scheduling delivery of content due to minimal network activity, which results in preserving the most network bandwidth. Again, FIG. 6 is a generalized illustration. Realistically, there can be many peaks and nulls in usage throughout the twenty-four day cycle creating many cost-effective time windows of opportunity for mobile operators to deliver content, e.g., 2:00PM–2:15PM, without harming real-time wireless network traffic.

Figure 7:
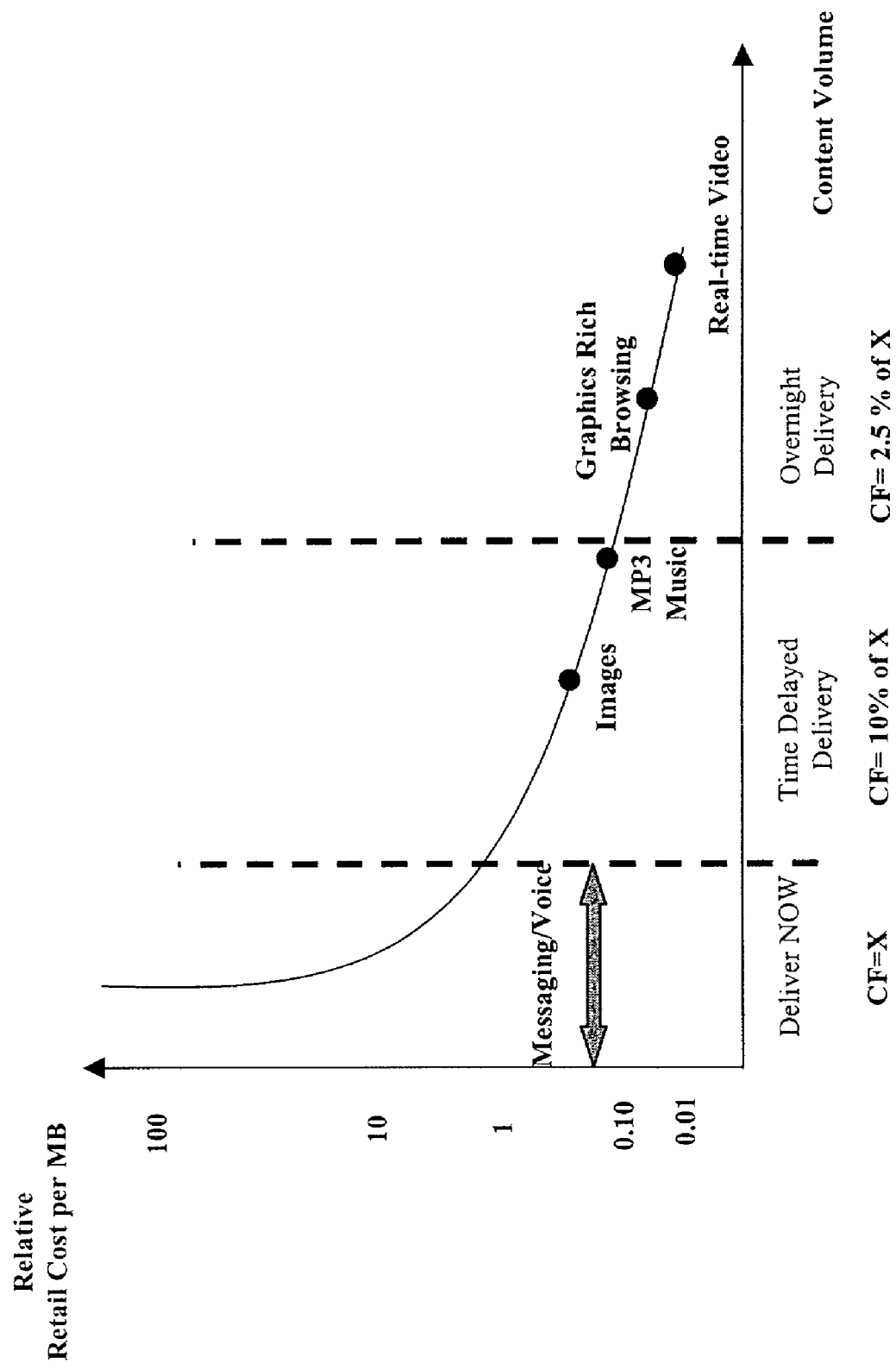
FIG. 7 illustrates the relative cost to deliver various services for each delivery class.

FIG. 7 illustrates some of the advantages provided to the service operator due to the embodiments of the present invention. The curved line represents a possible array of commercial services available on the market today, spanning from voice and text-based messaging to real-time video. The small content file size usually found in messaging, voice or equivalent services at a relative cost factor of 1 to 100 units per megabyte (MB) allows service operators to deliver this type of content essentially in real-time without suffering from cost spikes due to bandwidth limitations. Without the present invention, however, delivering content having large file sizes such as image files and MP3 music audio files, in real time, would be difficult to manage due to the wireless network bandwidth constraints, especially during peak traffic hours. In addition, the low retail cost per MB that the user could reasonably be charged for such large transfers would make it almost economically unfeasible for service operators. The present invention introduces the option for the Time Delayed Delivery region where the relative cost factor "X" is reduced to a fraction of X. In this region, content with the file size of image and MP3 files now can be delivered at a time when the wireless network has less demands for bandwidth which reduces the overall cost of content delivery to the user. The invention also makes it possible to lower the current traffic peaks by distributing the traffic over a longer time period. This time delayed delivery makes it economically feasible for service operators to deliver content in this spectrum of file size.

Finally, the third spectrum of content which demands the most network bandwidth, is graphics-rich browsing and real-time video files. In the absence of the present invention, the service operator could only charge a fraction per MB relative to what it could charge for messaging/voice services. Delivering this type of large file size message content in the "Deliver NOW" region would be cost prohibitive. The present invention allows large file content messages to be time-delay delivered at a pre-determined time window, taking advantage of low-load "time windows" in the network traffic loading profiles. The Overnight Delivery (e.g., selecting a time window within 24 hours) option could result in a cost factor reduction to 2.5% of X relative to the "Deliver Now" region. The significant reduction in cost to deliver high bandwidth content to the end-user will make delivering mobile services such as graphics-rich browsing and real-time video economically feasible. The three time delivery regions shown in FIG. 7 are for illustrative purposes only, and can be defined by the operator or Content/Service Provider. A variation of FIG. 7 could include users tapping into other data network access mechanisms (e.g. WLAN, DVB-T, Bluetooth etc.) through the MCD system allowing system operators to bill the user in the same manner, according to content delivery timing requirements.

Ramifications and Scope:

Although the description above contains many specifics, these are merely provided to illustrate the invention and should not be construed as limitations of the invention's scope. Thus, it will be apparent to those skilled in the art that various modifications and variations can be made in the system and processes of the present invention without departing from the spirit or scope of the invention. Accordingly, it is intended that the present invention cover its modifications and variations provided they come within the scope of the appended claims and their equivalents. In this context, "equivalents" means each and every implementation for carrying out the functions in the claims, even if not explicitly described herein.

We claim:

1. A mobile content delivery (MCD) system comprising:
provisioning means for maintaining user profiles;
charging means for generating corresponding billing information;
timing means for measuring absolute time remaining to deliver a content delivery message;
queuing means for placing said content in time remaining order;
locating means for identifying a wireless terminal device location;
on-line and statistical analyzing means for evaluating wireless network activity;
traffic analyzing means for intercepting and re-directing traffic;
interfacing means for utilizing different transport mechanisms; and
delivery scheduling means for scheduling delivery of said content based on an evaluation of said wireless network activity in an area in which a wireless terminal device is located.

2. The MCD system as in claim 1 wherein said timing means inserts an absolute time remaining value into the queue logic of the corresponding message.

3. The MCD system as in claim 1 wherein said queuing means places said message content into a queue.

4. The MCD system as in claim 1 wherein said locating means is capable of locating said wireless terminal device current location.

5. The MCD system as in claim 1 wherein said on-line and statistical analyzing means are capable of tracking usage of said wireless network.

6. The MCD system as in claim 1 wherein said delivery scheduling means schedules delivery by determining a cell's usage relative to its capacity, a message content file size, an absolute time remaining to deliver said message, and user location information.

7. A mobile content delivery wireless network comprising of:
a wireless terminal device, a content/service provider, a delivery server, a mobile content delivery system (MCD), and a messaging transport system; wherein the said wireless terminal device interacts with said elements;

said MCD system interacts with said elements;

said delivery system interacts with said MCD system;

said content/service provider interacts with said MCD system; and said content/service provider interacts with said messaging transport system, wherein said wireless terminal device interacts with said content/service provider through said MCD system, and upon content download the MCD system performs the download on behalf of the user, to the network, wherein a Quality Of Service (QoS) parameter is attached to a short message in order to adjust speed of delivery through the network.

8. The mobile content delivery wireless network as in claim 7 wherein said messaging transport system or MCD system contains or interacts with a Short Message System that delivers a wake-up message to said wireless terminal device.

9. The mobile content delivery wireless network as in claim 7 wherein said messaging transport system or MCD system receives a content delivery message from said content/service provider.

10. The mobile content delivery wireless network as in claim 7 wherein said MCD system schedules delivery of a content delivery message via said messaging transport system.

11. The mobile content delivery wireless network as in claim 7 wherein said MCD system schedules delivery of a content delivery message via some other delivery system.

12. The mobile content delivery wireless network as in claim 7 wherein said wireless terminal device receives a content from said messaging system, that acts as a delivery server.

13. The mobile content delivery wireless network as in claim 7 wherein said wireless terminal device sends content, and delivery from the wireless terminal towards the network is scheduled based on communication between the wireless device and the MCD system.

14. The mobile content delivery wireless network as in claim 7 wherein the MCD system interacts with the wireless terminal, informs it about a scheduled delivery being made, and disconnects the session, at the same time downloading the content from the content/service provider to the network.

15. The mobile content delivery wireless network as in claim 14 wherein the MCD system can first deliver a link address of the content to the wireless terminal and delay delivery of the actual content to ensure the most current content is received by the wireless terminal.

16. The mobile content delivery wireless network as in claim 14 wherein the MCD system intercepts the traffic based on content size, which web service is used, or based on a specific time where after all traffic should be intercepted.

17. The mobile content delivery wireless network as in claim 16 wherein the MCD system interception of traffic can be switched "on and off".

18. A wide area network system comprising:

a plurality of wireless terminal devices, a multiple base station system configuration, one or more base station controllers, a cellular network, a content/service provider, a messaging transport system, a short message system, and a mobile content delivery (MCD) system together capable of browsing, ordering, specifying a class of delivery, scheduling, and delivering content to said plurality of wireless terminal devices, wherein a Quality Of Service (QoS) parameter is attached to a short message in order to adjust the speed of the delivery through the network.

19. The wide area network system as in claim 18 wherein a user browses, orders, and specifies said class of delivery of a content.

20. The wide area network system as in claim 18 wherein the wireless terminal device sends addressing information such as IP address or mobile phone number, default messaging server address, and delivery class to the content/service provider.

21. The wide area network system as in claim 18 wherein the content/service provider system queries the user addressing information such as IP address or mobile phone number, default messaging server address, and delivery class.

22. The wide area network system as in claim 18 wherein said content/service provider is the source of said content.

23. The wide area network system as in claim 18 wherein said wireless terminal device is the source of said content.

24. The wide area network system as in claim 18 wherein said content/service provider forwards said content to said messaging transport system, or another designated delivery server, such as the MCD system.

25. The wide area network system as in claim 18 wherein said MCD system schedules a delivery time window of said content based on said class of delivery, user location, network capacity usage, and content file size.

26. The wide area network system as in claim 18 wherein said short message system delivers a wake-up message to said plurality of wireless terminal devices.

27. The wide area network system as in claim 18 wherein said messaging transport system or said designated delivery server delivers said content to said plurality of wireless terminal devices over said cellular network.

28. The wide area network system as in claim 18 wherein the content is delivered through an alternate network (e.g. Internet, ISDN, ADSL, Wireless LAN, Bluetooth, or other networks) based on the operator network architecture, the wireless network load condition, and the preferences set in a user profile.

29. The wide area network system as in claim 28 wherein said content delivered through said alternate network is billed to the user according to said class of delivery.

30. The wide area network system as in claim 18 wherein the MCD system performs traffic analysis and provides a means for intercepting and re-directing traffic based on the data in the traffic streams.

31. The wide area network system as in claim 18 wherein the MCD system performs traffic analysis and provides a means for inserting modified or new data in the traffic streams.

32. A device, comprising:

a memory having program code stored therein;

a processor disposed in communication with the memory for carrying out instructions in accordance with the stored program code; and a network interface disposed in communication with the processor;

wherein the program code, when executed by the processor, causes the processor to perform:

maintaining user profiles;

generating corresponding billing information;
measuring absolute time remaining to deliver a content delivery message;
placing content in time remaining order;
identifying a wireless terminal device location;
evaluating wireless network activity;
intercepting and re-directing traffic;
utilizing different transport mechanisms; and
scheduling delivery of said content based on an evaluation of said wireless network activity in an area in which a wireless terminal device is located.

* * * * *